United States Patent
Sayeh et al.

(10) Patent No.: US 10,611,102 B2
(45) Date of Patent: Apr. 7, 2020

(54) REPAIR CONCEPT COMPRISING PRE-IMPREGNATED PINNED FOAM CORE FOR SANDWICH STRUCTURAL COMPONENTS

(71) Applicant: Airbus Operations GmbH, Hamburg (DE)

(72) Inventors: Mohamed-Mourad Sayeh, Hamburg (DE); Tobias Karrasch, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 353 days.

(21) Appl. No.: 15/602,358

(22) Filed: May 23, 2017

(65) Prior Publication Data

US 2017/0341321 A1     Nov. 30, 2017

(30) Foreign Application Priority Data

May 25, 2016 (DE) .................. 10 2016 209 140

(51) Int. Cl.
*B32B 41/00* (2006.01)
*B29C 73/04* (2006.01)
(Continued)

(52) U.S. Cl.
CPC ............ *B29C 73/04* (2013.01); *B29C 69/001* (2013.01); *B29C 70/086* (2013.01); *B29C 70/24* (2013.01);
(Continued)

(58) Field of Classification Search
CPC ....... B29C 73/04; B29C 70/24; B29C 70/086; B29C 73/06; B29C 70/68; B29C 69/001;
(Continued)

(56) References Cited

U.S. PATENT DOCUMENTS 5,869,165 A    2/1999   Rorabaugh et al.
5,876,540 A *  3/1999   Pannell ................. B29C 65/344
                                              156/91

(Continued)

FOREIGN PATENT DOCUMENTS

DE        10018035 A1    10/2001
DE    102005024408 A1    11/2006
(Continued)

OTHER PUBLICATIONS

German Search Report, dated Jan. 30, 2017, priority document.
European Search Report; priority document.

*Primary Examiner* — Michael N Orlando
*Assistant Examiner* — Joshel Rivera
(74) *Attorney, Agent, or Firm* — Greer, Burns & Crain, Ltd.

(57) ABSTRACT

A method for repairing a sandwich composite structure comprising a pinned foam core. In the sub-region in which the pinned foam core is damaged, the at least one upper or lower cover layer is removed as far as the pinned foam. The pinned foam core is removed. A pinned replacement foam core is inserted, the pinned replacement foam core being impregnated with a resin. An upper or lower replacement cover layer is applied. The pinned replacement foam core and optionally the upper or lower replacement cover layer are cured.

14 Claims, 1 Drawing Sheet

(51) Int. Cl.
    *B29D 99/00*     (2010.01)
    *B29C 70/24*     (2006.01)
    *B29C 70/08*     (2006.01)
    *B29C 73/06*     (2006.01)
    *B29C 69/00*     (2006.01)
    *B29C 70/68*     (2006.01)
    *B29K 79/00*     (2006.01)
    *B29K 75/00*     (2006.01)
    *B29K 105/04*     (2006.01)
    *B29L 9/00*     (2006.01)

(52) U.S. Cl.
    CPC .............. *B29C 70/68* (2013.01); *B29C 73/06* (2013.01); *B29D 99/001* (2013.01); *B29K 2075/00* (2013.01); *B29K 2079/08* (2013.01); *B29K 2105/04* (2013.01); *B29K 2715/003* (2013.01); *B29L 2009/00* (2013.01)

(58) Field of Classification Search
    CPC .............. B29D 99/001; B29K 2105/04; B29K 2079/08; B29K 2075/00; B29K 2715/003; B29L 2009/00
    USPC .................... 156/64, 91, 350, 351, 378, 379
    See application file for complete search history.

(56) References Cited

U.S. PATENT DOCUMENTS

| | | |
|---|---|---|
| 8,474,388 B2 | 7/2013 | Roth |
| 9,289,927 B2 | 3/2016 | Weber et al. |
| 2008/0193710 A1 | 8/2008 | Branca |
| 2009/0188748 A1 | 7/2009 | Stevenson |
| 2012/0141769 A1 | 6/2012 | Weber et al. |

FOREIGN PATENT DOCUMENTS

| | | |
|---|---|---|
| DE | 102007051422 A1 | 4/2009 |
| EP | 1642702 A2 | 4/2006 |

\* cited by examiner

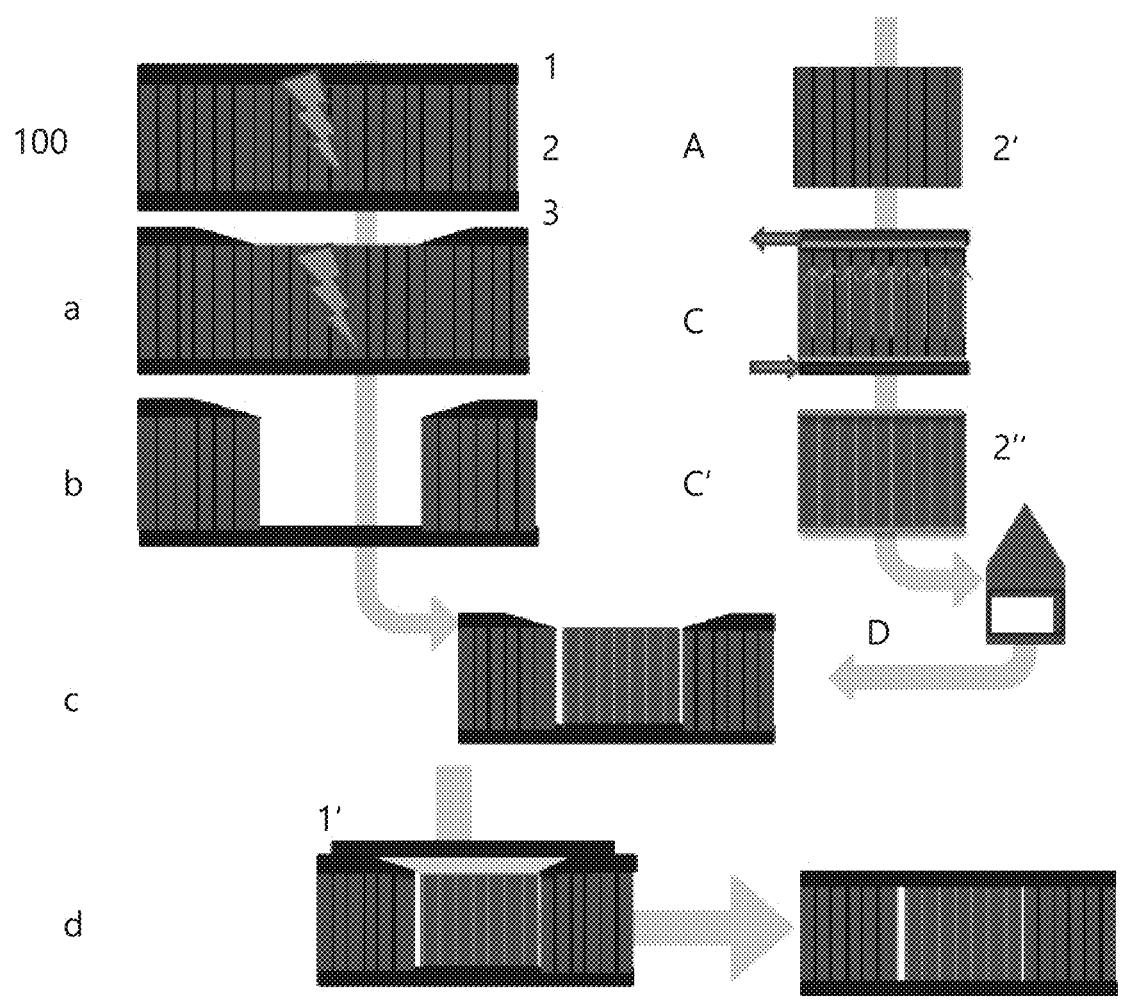

REPAIR CONCEPT COMPRISING PRE-IMPREGNATED PINNED FOAM CORE FOR SANDWICH STRUCTURAL COMPONENTS

CROSS-REFERENCES TO RELATED APPLICATIONS

This application claims the benefit of the German patent application No. 102016209140.9 filed on May 25, 2016, the entire disclosures of which are incorporated herein by way of reference.

FIELD OF THE INVENTION

The present invention relates to a method for repairing a sandwich composite structure comprising a pinned foam core, to a sandwich composite structure repaired thereby, to a method for manufacturing an impregnated pinned foam core or replacement foam core, and to an impregnated pinned foam core or replacement foam core.

BACKGROUND OF THE INVENTION

Sandwich composite structures comprising a pinned foam core are used in a multiplicity of applications, for example in vehicle construction and shipbuilding as well as in aerospace, but also in industrial components. They achieve a good stability and strength at a low weight. By comparison with other structures, pinned foam cores can be impregnated with resin along the pins and subsequently cured, making it possible further to reinforce the structure.

As a result of limitations on the loading thereof, the foam cores of a sandwich composite structure of this type generally have to be connected to parts of cover layers so as to provide sufficient stability.

However, when repairing sandwich composite structures, the pinned foam core is not easily accessible. For example, it is of course possible to undertake complete repair of the entire sandwich structure, but in this case both the pinned foam core and the two cover layers enclosing the pinned foam core in a sandwich have to be replaced.

In particular for internal parts, no suitable method for repair is known thus far.

SUMMARY OF THE INVENTION

Therefore, an idea of the present invention is to provide an improved repair method for sandwich composite structures comprising a pinned foam core and impregnated pinned replacement foam cores which can be made use of in a method of this type.

Thus, an impregnated pinned replacement foam core is provided which can be inserted into the sandwich composite structure to be repaired and connected thereto in such a way that a one-sided repair method can be used.

The inventors have found that, as a result of the use of a pinned foam core which is already (pre-)impregnated as a replacement, successful repair can be carried out, since it is no longer necessary subsequently to introduce a sufficient amount of resin for further curing of the core and on the connection faces to the cover layers, this introduction otherwise being made difficult by the difficulty of introducing the resin into the pinned foam core along the pins during one-sided impregnation. Optionally, however, small amounts of resin, adhesive film or the like are added.

In this way, it is merely necessary to remove one cover layer of the sandwich composite structure, and, as a result, it is possible both to save on resources and to reduce the repair outlay. In addition, this also makes it possible to improve the stability of the repaired sandwich composite structure, since it is only necessary to remove and reinsert one cover layer, and so the other cover layer can remain undamaged. This other cover layer may additionally serve as an adhesion point for the impregnated pinned replacement foam core, meaning that the adhesion thereof in the repaired sandwich composite structure can also be improved.

BRIEF DESCRIPTION OF THE DRAWINGS

In the following, the invention is described by way of embodiments and with reference to the accompanying drawings, in which:

The FIGURE is a schematic illustration of how to carry out a repair method according to the invention for a defective sandwich composite structure.

In the drawings, like reference numerals denote like or functionally equivalent components unless specified otherwise.

DETAILED DESCRIPTION OF THE PREFERRED EMBODIMENTS

A first aspect of the present invention relates to a method for repairing a sandwich composite structure comprising a pinned foam core between at least one upper and at least one lower cover layer, in which the pinned foam core is damaged in a sub-region of the sandwich composite structure, comprising the following steps in the following sequence:

a) removing the at least one upper or lower cover layer as far as the pinned foam core in the sub-region in which the pinned foam core of the sandwich composite structure is damaged;

b) removing the pinned foam core in the sub-region in which the pinned foam core of the sandwich composite structure is damaged;

c) inserting a pinned replacement foam core, corresponding in size to the removed pinned foam core of step b), in the sub-region in which the pinned foam core was removed in step b), the pinned replacement foam core being impregnated at least with a resin;

d) applying an upper or lower replacement cover layer in the region in which one was removed in step a), wherein the pinned replacement foam core and optionally the upper or lower replacement cover layer are cured.

Steps a) to d) are not specifically limited in the implementation thereof, and can be undertaken both by hand and by machine (for example by using robots). In some embodiments, step a) may, for example, be carried out by cutting out or milling out the appropriate cover layer. Likewise, step b) may, for example, be carried out by cutting out or milling out. In some embodiments, the foam core is replaced over the entire depth so as to glue the pin on both sides so as to provide a suitable connection to both cover layers. The removal may be followed, for example, by a further cleaning step and/or preparation step, for example on the remaining surfaces of the exposed pinned foam core.

In steps c) and/or d), the replacement foam core and/or the replacement cover layer may be applied in a suitable way, it being possible to produce them to the corresponding dimension of the removed foam core and/or removed cover layer before application.

In some embodiments, the replacement foam core is produced, for example cut or milled, to a suitable size before being impregnated with resin so as to prevent contamination of the resin when the impregnated pinned foam core is prepared for insertion in step c). Depending on the type and size of the defect in the pinned foam core, it may thus also be necessary for an appropriate piece of a replacement foam core to be manufactured for the repair. Alternatively, however, repairs may also be carried out by using impregnated pinned replacement foam cores which are already manufactured in advance and which have been stored in advance, for example if the defect is smaller than a stored impregnated pinned replacement form core of this type. Depending on the type of defect, it can be decided whether an impregnated pinned replacement foam core already present in storage can be used, or whether an impregnated pinned replacement foam core has to be manufactured for the repair.

In a manner corresponding to step c), the replacement cover layer in step d) may also be prepared to a suitable size before application. However, this does not exclude the possibility that the replacement cover layer may overlap with the already present, remaining cover layer from step a), and the replacement cover layer in this overlap region may be removed in a suitable manner, for example by milling, after application and optional curing.

According to the invention, the pinned foam core is not specifically limited, and comprises those conventionally used in the field of the automotive industry, shipbuilding and/or the aerospace industry. A pinned foam core should be understood to mean a cured foam structure which may be of any desired shape, for example a plate, cube, cylinder, etc. The foam core may optionally be provided with cover layers on the outer faces, for example glass/carbon fabrics or special fabrics, which can subsequently be removed before or after impregnation or before introduction into a sandwich composite structure to be repaired in step c) above. Further, the pinned foam core comprises pins which pass through the foam core and which, in some embodiments, protrude from the foam core on both sides and are visible thereon, the excess length of the pins not being specifically limited so long as they do not interfere with the repair. Thus, in some embodiments the pins are longer than the thickness, in the direction of which they are introduced through the foam core, of the foam core.

The material of the foam core, as well as of the pinned replacement foam core, which in some embodiments may correspond in composition to the removed foam core (but may also differ therefrom), is not specifically limited and comprises, for example, polymers which can form foams such as polyimides or polyurethanes. In some embodiments, the foam of the foam core is closed-pore, in other words impermeable to the resin with which the pinned foam core is impregnated. This prevents the resin from penetrating into the foam. Instead, impregnation is only carried out along the pins. Since the resin is usually heavier than the foam, in this way an undesired increase in the mass of the pinned foam core can be prevented, whilst it is still possible to reinforce the pinned foam core sufficiently by curing the resin along the pins. Thus, sandwich composite structures can be obtained which are used for a lighter construction, and this can be used in industries in which a reduction in the weight of the components is desired, for example in the aerospace industry, for example in aircraft construction.

The resin for impregnating the pinned foam core is also not specifically limited, and may comprise resins suitable for impregnating a pinned foam core, for example RTM6 and/or other resins or resin systems, for example based on epoxy resin. Mixtures of resins, in other words more than one resin, are also possible.

Likewise, the material of the pins is not specifically limited, and includes, for example, fibers and/or fiber bundles. These may, for example, be polymer fibers, glass fibers, carbon fibers, metal fibers or the like. These may be introduced into the foam core in a suitable manner and optionally cut to a suitable length. Fibers which do not become brittle when cooled, for example to 0° C. or less, −10° C. or less, −15° C. or less, for example to −40° C. or −50° C. or lower, can be used in such a way that storage and, if applicable, use, are still possible under extreme conditions, such as in an external region of an aircraft.

Along these pins, and thus for example along fibers and/or fiber bundles, it is subsequently possible to carry out infusion with resin through the foam core in a suitable manner, for example using a vacuum installation on a pinned face of the foam core, it subsequently being possible on the other side to introduce the pins into a resin which is subsequently drawn through the foam core along the pins by applying a vacuum. After the infusion with the resin is completed, resin also remaining on the pinned surfaces (the surfaces from which the pins, for example fibers and/or fiber bundles, protrude) in some embodiments, the vacuum installation can be removed, in such a way that an impregnated pinned foam core is present. As an alternative to a vacuum infusion process of this type, other suitable processes may be used for infusing the foam core with the resin, such as RTM (resin transfer molding), MVI (modified vacuum infusion) or a VAP (vacuum-assisted process).

The upper and/or lower cover layer and replacement cover layer are also not specifically limited, and may be identical or different. In some embodiments, the removed cover layer and the replacement cover layer are substantially identical in composition. It is possible for the cover layer in question to comprise more than one material layer and/or for further layers also to be added to the relevant cover layer towards the outside, which may also need to be removed and repaired.

For example, the upper and/or lower cover layer comprises a dry fabric and/or a prepreg, in other words fibers pre-impregnated with resin, the fibers and the resin also not being specifically limited in this case, and it being possible for the prepreg, for example, to comprise glass-fiber-reinforced and/or carbon-fiber-reinforced plastics material, for example based on epoxide, such as M21E/IMA prepregs. However, instead of glass and/or carbon fibers or in addition, other fibers such as aramid fibers, basalt fiber, etc., may be provided in the prepreg. During repair, the replacement cover layer can be uncured when applied in step d).

The prepregs can be applied to an upper or lower cover layer while uncured in step d) and cured together with the replacement foam core. However, instead of prepregs, other cover layers may also be provided which can be connected suitably to the remaining cover layer again during a repair, for example including by using curing resins or other adhesive substances.

Alternatively, for example, a dry fabric, as a replacement cover layer, may also optionally be impregnated with a resin during repair and subsequently cured together with the replacement foam core after application to the sandwich composite structure to be repaired. The dry fabric is not specifically limited, and may also for example be constructed of fibers, for example the aforementioned fibers.

Likewise, the relevant resin for the corresponding cover layer is not specifically limited, and may, for example, also include the same resins used for impregnating the pinned foam core. In some embodiments, the pinned replacement foam core and the upper or lower replacement layer are cured together, in this case, for example, it being possible to carry out uniform curing if the same resin or resins are used in the impregnated foam core and for the cover layer. The curing is not specifically limited, and may be carried out in a suitable manner, for example thermally and/or using radiation, for example IR radiation.

The replacement cover layer can be applied in an orientation (for example as regards the fiber orientation) similar to the removed cover layer, so as to achieve suitable strength after repair.

In some embodiments, before step c), in the sub-region in which the pinned foam core was removed in step b), a binder is applied to the remaining pinned foam core and/or the lower or upper cover layer remaining in this sub-region.

In some embodiments, after step c), a binder is applied in the region of the upper or lower cover layer in which this layer was removed.

The binder which is applied in the sub-region of the removed foam core and/or of the removed cover layer is not specifically limited and may, for example, comprise resins and/or adhesive media such as adhesive films or the like. In some embodiments, the binder is applied in regions which do not come into contact with a resin of the replacement foam core (for example on the pinned face) and/or of the replacement cover layer (for example in the case of an uncured prepreg), for example the unpinned faces of the replacement foam core. The above-mentioned resins, for example, are suitable as the resin, for example RTM6. The binder provides the wet/dry contact and can lead to additional stability in the connection in the region of the repair to the sandwich composite structure, for example by curing.

A further aspect of the present invention relates to a repaired sandwich composite structure manufactured by the method according to the invention. During the repair one of the two cover layers of the sandwich composite structure has substantially not been damaged, and so corresponding strength is provided in this layer.

In some embodiments, the repaired sandwich composite structure according to the invention is part of an aircraft component.

Another further aspect of the present invention relates to a method for manufacturing an impregnated pinned foam core or replacement foam core impregnated with at least one resin, comprising the following steps:
 a) providing a pinned foam core;
 b) optionally cutting the pinned foam core to a particular size to manufacture a pinned replacement foam core; or
 a') providing a foam core;
 b') optionally cutting the foam core to a particular size; and
 b") introducing pins into the foam core to manufacture a pinned foam core or replacement foam core; and
 c) impregnating the pinned foam core or replacement foam core with the at least one resin along the pin structure.

Thus, in this method impregnated pinned foam cores can be manufactured which, for example, can also be stored in reserve, or impregnated pinned replacement foam cores which can likewise be stored in reserve, but also, for example, can be used for repair.

In particular embodiments, the present invention relates to a method for manufacturing an impregnated pinned replacement foam core which is impregnated with at least one resin, comprising the following steps:
 a) providing a pinned foam core;
 b) cutting the pinned foam core to a particular size to manufacture a pinned replacement foam core; or
 a') providing a foam core;
 b') cutting the foam core to a particular size and introducing pins into the foam core to manufacture a pinned replacement foam core; and
 c) impregnating the replacement foam core with the at least one resin along the pin structure.

Thus, alternatively, in the method according to the invention for manufacturing an impregnated pinned replacement foam core, the steps a) and optionally b)/b), or a'), optionally b')/b'), and b"), can be carried out before step c).

The provision in step a) is not specifically limited. For example, a foam core may already be obtained as a pinned foam core or only be provided with pins on site after being obtained from the manufacturer, it being possible to do this in a suitable manner. Likewise, the provision in step a') is not specifically limited.

Further, the cutting to size in step b) or b') is not specifically limited. It also need not be carried out if a foam core or pinned foam core is already provided appropriately cut to size. In particular, cutting to size also need not involve mechanical cutting, but, for example, a further method may also alternatively or additionally be used by which a foam core or pinned foam core can be brought to a desired size or "cut to size," for example a milling method.

The introduction of the pins in step b'), like the optional introduction of the pins before step a), is not specifically limited.

The impregnation in step c) is likewise not specifically limited, and may, for example, be carried out in a manner such as that discussed above in relation to the method for repairing a sandwich composite structure. For example, in some embodiments, the impregnation in step c) is carried out in such a way that on a face of the pinned foam core or replacement foam core on which pins protrude the pinned foam core or replacement foam core is brought into contact with at least one resin, and a vacuum is applied on the opposing face with protruding pins. However, aside from the vacuum infusion process, the other aforementioned methods such as RTM, MVI, a VAP or similar methods may be used.

Likewise, suitable materials for the foam core or replacement foam core, in other words including during the manufacture thereof, correspond to those mentioned in the method according to the invention for repairing a sandwich composite structure. In some embodiments, the foam of the pinned foam core is closed-pore.

In some embodiments, the pinned foam core is impregnated at a temperature below the polymerization temperature of the at least one resin, for example at least 5° C. or at least 10° C. below the polymerization temperature of the at least one resin, to ensure that the resin is not cured during impregnation. However, the temperature of the resin should not be too low so as not to keep the viscosity of the resin too low, since otherwise the impregnation could be negatively affected. As a result, in some embodiments the at least one resin is heated during impregnation. In some embodiments, the pinned foam core is impregnated at a temperature below a temperature which does not negatively affect the at least one resin, for example as regards the usability thereof (for example degasification).

In some embodiments, the impregnated pinned foam core or replacement foam core is cooled after the impregnation in step c). It can thus be ensured that the at least one resin does not react, and the foam core or replacement foam core is brought to the place of use thereof for a possible repair or is stored.

In some embodiments, after step c) the impregnated pinned foam core or replacement foam core is vacuum-bagged and/or is stored at a temperature of less than 10° C., 0° C. or less, −10° C. or less, or −15° C. or less, for example −18° C. As a result of the vacuum bagging, contamination of the foam core or replacement foam core, in particular on the outer faces provided with resin, which may be sticky, can be reduced or prevented. Also, in the case of storage at a low temperature, the duration of usability (shop life) of the foam core or replacement foam core can be increased, for example to several (up to 6, 7, 8, 9 or more) months. After storage and cooling, for example freezing, before application in a method according the invention, thawing may be carried out, for example including incrementally, for example keeping at 4° C. for 24 h. However, during thawing of this type, the possibility is not excluded that the impregnated pinned foam core or replacement foam core may subsequently be cooled again.

A further aspect of the present invention relates to an impregnated pined foam core or replacement foam core comprising a pinned foam core or replacement foam core which is cut to size and which is impregnated with at least one resin along the pin structure. The materials of the pins, of the foam core and of the at least one resin correspond to those mentioned above in connection with the method according to the invention. The thickness of the foam core or replacement foam core according to the invention need not be uniform, and may also, for example, be adapted to a component to be repaired, for example including having regions of different thicknesses. The component may also be planar, or else be of a different construction, for example in the form of a cylinder, a pyramid, etc. The impregnated pinned foam core or replacement foam core may for example be stored in reserve or else specially produced "to size" for a repair.

Further, the impregnated pinned foam core or replacement foam core may further comprise a peel-off film or the like which is provided on the faces of the foam core not provided with pins. The peel-off film may be provided in one or more pieces, and is not specifically limited, so long as it can be removed in a suitable manner before the use of the impregnated pinned foam core or replacement foam core in manufacture or repair, but remains stable on the impregnated pinned foam core or replacement foam core during storage.

In some embodiments, the impregnated pinned foam core or replacement foam core may be vacuum-bagged in vacuum packing, for example for storage and/or transport, the vacuum packing not being specifically limited, so long as it can easily be removed during use of the impregnated pinned foam core or replacement foam core.

In some embodiments, the impregnated pinned foam core or replacement foam core is manufactured by the method according to the invention for manufacturing an impregnated pinned foam core or replacement foam core.

Example

In the following, the invention is portrayed more clearly by way of an example method sequence illustrated in the FIGURE.

The top left of the FIGURE shows a defective sandwich composite structure 100 in which the pinned foam core 2 suffers from a defect. An upper cover layer 1 and a lower cover layer 3 are located around the pinned foam core 2.

For the repair, initially in step a the upper cover layer 1 is removed. This may for example be carried out by milling away incrementally in the region to be repaired. Subsequently, the defective pinned foam core is removed in step b. Of course, as in the general method according to the invention, the possibility is not excluded that regions adjacent to the defect are also removed, for example so as to facilitate the removal or so as to adapt the removed region to the size of an impregnated pinned replacement foam core 2" in storage.

Subsequently, the surfaces to be connected are optionally cleaned or prepared in the region of the repair and provided with a binder, for example an adhesive film, for example in the region of the remaining foam core.

Now, in step c, an impregnated pinned replacement foam core 2" is inserted, which may be taken from a storage reserve or else may be manufactured for the repair, as is shown on the right in FIG. 1 and also explained in greater detail in the following.

If this has not happened previously, a binder for the upper replacement cover layer 1' may now be applied in the milled region. Subsequently, in step d, the upper replacement cover layer 1' is applied, for example in the same orientation as the existing upper cover layer 1 (for example in the case of fiber-reinforced plastics materials), and connected to the remaining upper cover layer 1 so as to obtain a repaired sandwich composite structure 101. In the case of a prepreg as an upper cover layer 1, the connection may, for example, be provided using vacuum bagging with subsequent curing, it being possible for the impregnated pinned replacement foam core 2" also to be cured during the curing, in the case of a dry fabric, by an infusion process, for example using resin, optionally with heating, followed by drying and/or curing in a furnace or with heating or radiation.

As stated above, for the repair process shown in FIG. 1, an impregnated pinned replacement foam core 2" can be manufactured, as is shown on the right in FIG. 1. A pinned replacement foam core 2' can be provided in step A and optionally also manufactured to a particular size to be used. It can be impregnated with a resin by vacuum infusion, as is shown in step C. The resin may, for example, be heated to a temperature below the polymerization temperature. The impregnation takes place along the pins, from bottom to top under the effect of a vacuum as shown in FIG. 1. The pinned foam core can be fixed so as to achieve uniform impregnation. On the unpinned face, the foam core may additionally comprise a peel-off film, in particular if it is to be stored. After the impregnation (infusion), the obtained impregnated pinned replacement foam core 2" can be cooled and, if applicable, fixing means and impregnation means, etc., can be removed, resulting in the now storable or usable impregnated pinned replacement foam core 2" being obtained, step C'. As is shown in FIG. 1, it may be stored, for example after vacuum bagging, until use, as is shown in step D, for example at −18° C., but may also be used immediately. After storage at −18° C., the impregnated pinned replacement foam core 2" can be thawed before repair so as subsequently to be used in step c.

Using the method according to the invention, it was possible to repair various test sandwich composite structures for aircraft components configured in various shapes, comprising M21E/IMA prepregs as cover layers and epoxy-based foam cores pinned with glass fiber bundles and comprising RTM6 as a resin or binder.

Although the present invention has been described above by way of preferred embodiments, it is not limited thereto, but can be modified in numerous ways.

For example, instead of repairs on aircraft components, repairs may be undertaken on components of pleasure craft, racing cars, rockets etc., it also being possible for different pins, foam cores, resins or cover layers to be made use of depending on the application.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for repairing a sandwich composite structure comprising a pinned foam core between at least one upper and at least one lower cover layer, in which the pinned foam core is damaged in a sub-region of the sandwich composite structure, comprising the following steps in the following sequence:
    a) removing the at least one upper or lower cover layer as far as the pinned foam core in the sub-region in which the pinned foam core of the sandwich composite structure is damaged;
    b) removing the pinned foam core in the sub-region in which the pinned foam core of the sandwich composite structure is damaged;
    c) inserting a pinned replacement foam core, corresponding in size to the removed pinned foam core of step b), in the sub-region in which the pinned foam core was removed in step b), the pinned replacement foam core being impregnated at least with a resin;
    d) applying an upper or lower replacement cover layer in the region in which one was removed in step a),
    wherein the pinned replacement foam core and optionally the upper or lower replacement cover layer are cured.

2. The method for repairing a sandwich composite structure of claim 1, wherein the pinned replacement foam core and the upper or lower replacement cover layer are cured together.

3. The method for repairing a sandwich composite structure of claim 1, wherein, before step c), in the sub-region in which the pinned foam core was removed in step b), a binder is applied to the remaining pinned foam core remaining in this sub-region.

4. The method for repairing a sandwich composite structure of claim 1, wherein, before step c), in the sub-region in which the pinned foam core was removed in step b), a binder is applied to the remaining lower cover layer remaining in this sub-region.

5. The method for repairing a sandwich composite structure of claim 1, wherein, before step c), in the sub-region in which the pinned foam core was removed in step b), a binder is applied to the remaining upper cover layer remaining in this sub-region.

6. The method for repairing a sandwich composite structure of claim 1, wherein, after step c), a binder is applied in the region of the upper cover layer in which this layer was removed.

7. The method for repairing a sandwich composite structure of claim 1, wherein, after step c), a binder is applied in the region of the lower cover layer in which this layer was removed.

8. A repaired sandwich composite structure, manufactured by a method comprising the following steps in the following sequence:
    a) removing the at least one upper or lower cover layer as far as the pinned foam core in the sub-region in which the pinned foam core of the sandwich composite structure is damaged;
    b) removing the pinned foam core in the sub-region in which the pinned foam core of the sandwich composite structure is damaged;
    c) inserting a pinned replacement foam core, corresponding in size to the removed pinned foam core of step b), in the sub-region in which the pinned foam core was removed in step b), the pinned replacement foam core being impregnated at least with a resin;
    d) applying an upper or lower replacement cover layer in the region in which one was removed in step a),
    wherein the pinned replacement foam core and optionally the upper or lower replacement cover layer are cured.

9. The method for repairing a sandwich composite structure of claim 1, wherein before step c) the replacement foam core is vacuum-bagged.

10. The method for repairing a sandwich composite structure of claim 9, wherein before step c) the replacement foam core is stored at a temperature of less than 10° C.

11. The method for repairing a sandwich composite structure of claim 1, wherein before step c) the replacement foam core is stored at a temperature of less than 10° C.

12. The repaired sandwich composite structure of claim 8, wherein before step c) the replacement foam core is vacuum-bagged.

13. The repaired sandwich composite structure of claim 12, wherein before step c) the replacement foam core is stored at a temperature of less than 10° C.

14. The repaired sandwich composite structure of claim 8, wherein before step c) the replacement foam core is stored at a temperature of less than 10° C.

* * * * *